(12) United States Patent
Johansson et al.

(10) Patent No.: US 8,472,337 B2
(45) Date of Patent: Jun. 25, 2013

(54) VARIATION OF UP LINK RESOURCES IN A CELLULAR SYSTEM

(75) Inventors: Magnus Johansson, Göteborg (SE); Magnus Gannholm, Mölnlycke (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 305 days.

(21) Appl. No.: 12/863,566

(22) PCT Filed: Jan. 25, 2008

(86) PCT No.: PCT/SE2008/050089
§ 371 (c)(1), (2), (4) Date: Jul. 19, 2010

(87) PCT Pub. No.: WO2009/093944
PCT Pub. Date: Jul. 30, 2009

(65) Prior Publication Data
US 2010/0290363 A1    Nov. 18, 2010

(51) Int. Cl.
*H04J 3/14* (2006.01)
*H04W 4/00* (2009.01)
*H04Q 7/20* (2006.01)

(52) U.S. Cl.
USPC ............ 370/252; 370/329; 370/336; 455/522

(58) Field of Classification Search
USPC ........................... 370/252–468; 455/522, 450
See application file for complete search history.

(56) References Cited

U.S. PATENT DOCUMENTS

| | | | |
|---|---|---|---|
| 5,802,040 A * | 9/1998 | Park et al. ..................... 370/232 |
| 6,560,463 B1 * | 5/2003 | Santhoff ....................... 455/522 |
| 6,628,626 B1 * | 9/2003 | Nordgaard et al. ............. 370/277 |
| 6,925,068 B1 * | 8/2005 | Stanwood et al. ............ 370/329 |
| 7,962,146 B2 * | 6/2011 | Ludwig et al. ................. 455/450 |
| 8,169,957 B2 * | 5/2012 | Damnjanovic ................. 370/329 |
| 2008/0186892 A1 * | 8/2008 | Damnjanovic ................. 370/311 |
| 2011/0075621 A1 * | 3/2011 | Sung et al. ..................... 370/329 |

FOREIGN PATENT DOCUMENTS

WO    2007/064267 A1    6/2007

OTHER PUBLICATIONS

Swedish Patent Office, Int'l Search Report in PCT/SE2008/050089, Nov. 11, 2008.
3GPP, Evolved Universal Terrestrial Access (E-UTRA) and Evolved Universal Terrestrial Radio Access Network (E-UTRAN), Overall Description, Stage 2 (Release 8), Tech. Spec. 36.300 v8.3.0, Dec. 2007, Section 5.2.3.

(Continued)

*Primary Examiner* — Afsar Qureshi
(74) *Attorney, Agent, or Firm* — Potomac Patent Group PLLC (57) ABSTRACT

The invention discloses a method (300) for a cellular system (100) with a first node (110) which controls traffic to and from users (120) in a cell (130). Traffic between the users (120) and the first node (110) comprises user resources and control resources, with uplink traffic, comprising channels sent in data frames (200). Each data frame comprises a number of resource blocks (1, 2, 3, 4), and each uplink channel is allotted an amount of resource blocks in each data frame. At least part of the traffic between the users and the first node is divided (305) into first and second groups, and a cell's usage of the first and second group is monitored (310). The amount of resource blocks which is allotted to one of the uplink channels in a cell (130) is varied (315) depending on the cell's usage of these two groups.

14 Claims, 4 Drawing Sheets

OTHER PUBLICATIONS

3GPP, Evolved Universal Terrestrial Access (E-UTRA), Physical Channels and Modulation (Release 8), Tech. Spec. 36.211 v8.1.0, Nov. 2007, Section 5.4.4.

A. Ghosh et al., Uplink Control Channel Design for 3GPP LTE, 18th Int'l Symposium on Personal, Indoor and Mobile Radio Communications, Sep. 2007, pp. 1-5, IEEE.

* cited by examiner

VARIATION OF UP LINK RESOURCES IN A CELLULAR SYSTEM

TECHNICAL FIELD

The present invention discloses a method for use in a cellular wireless communication system in which there is a first node which serves to control traffic to and from users in a cell in the system, and in which system up link traffic, i.e. traffic from the users to the first node, is sent as signals on channels in sub frames.

BACKGROUND

The 3GPP LTE (3rd Generation Partnership Project, Long Term Evolution) systems are systems which use radio access technology for packet-switched services. In similarity to other cellular systems, LTE systems comprise a number of cells, each of which can accommodate a number of users, and there is a controlling node for each cell, in LTE known as the eNodeB, "evolved NodeB". Traffic from the eNodeB to the users is referred to as down link (DL) traffic, and traffic from the users to the eNodeB is referred to as up link (UL) traffic.

The LTE systems do not use dedicated channels, which means that all data in down link and up link is transmitted in shared channels, which in turn means that each user, also sometimes referred to as UE, "User Equipment", needs to be scheduled in time and frequency in order to be able to receive and transmit data. The scheduling of the UEs in an LTE cell is carried out by the eNodeB of that cell.

Up link traffic in LTE is sent in so called sub frames, with each sub frame having, at present, a duration of 1 ms, and comprising a number of carrier frequencies, so called sub carriers. Thus, an LTE sub frame has an extension both in frequency and in time. In time, the LTE sub frame's 1 ms is divided into slots.

In LTE, there is a control channel known as the Physical Uplink Control Channel, abbreviated as PUCCH. The PUCCH is UE specific, and multiple PUCCHs can exist in parallel.

The UEs use the PUCCH in order to transmit control information such as, for example, the Channel Feedback Report, CFR, Hybrid Automated Repeat Request/Acknowledge, HARQ/ACK, and scheduling requests to the eNodeB of the cell.

The PUCCH is sent in the LTE sub frames, and is allotted a number of so called Resource Blocks, RBs, within a sub frame. An RB comprises a number of sub carriers and time slots within a sub frame, where the maximum number of sub carriers and time slots occupied by an RB obviously being limited by the number of sub carriers and time slots in a sub frame.

As can be realized, the amount of resources, i.e. RBs, needed for PUCCH for a UE will vary with a number of factors, such as, for example, the number of active UEs in the cell, which will influence the amount of CFR reports sent. Examples of other influencing factors are the traffic volumes in the down link and the uplink.

At present, there is no satisfactory mechanism in LTE for fitting the amount of PUCCH resources, i.e. RBs, which are allotted to a UE to the needs of the UE. One obvious mechanism would be to set the number of RBs for a UE to a fix value. However, this would cause a number of problems, such as, for example, the following:

In cases with a small number of UEs in a cell, and consequently few UEs transmitting control signals such as CFR, HARQ-ACK or scheduling request in each subframe, the PUCCH resources would be over-dimensioned, which would lead to a waste of uplink bandwidth, since some of the RBs allotted to PUCCH could be used for data traffic instead.

In cases with many UEs in a cell, and with many UEs using services with low bandwidth that are multiplexed in the same downlink subframe, the PUCCH resources would risk becoming a bottleneck that would prevent efficient downlink resource usage for data traffic.

SUMMARY

Thus, as has emerged from the description above, there is a need for a solution by means of which the amount of resource blocks which is allotted to a certain channel within a data frame in a cellular wireless communication system can be variably adapted to the situation in a better way than previously. Suitably, such a solution should be possible to apply to cellular communications system in general, not just in LTE systems.

This need is addressed by the present invention in that it discloses a method for use in a cellular wireless communication system in which there is a first node which serves to control traffic to and from users in a certain area, a cell, in the system, and in which system traffic between the users and the first node comprises user resources and control resources.

In a system in which the invention may be applied, the uplink traffic, i.e. the traffic from the users in the cell to the first node of the cell, comprises channels which are sent in data frames. Each data frame comprises a number of resource blocks, and each uplink channel is allotted a certain amount of resource blocks in each data frame.

According to the method of the invention, at least part of the traffic between the users and the first node is divided into a first and a second group, and a cell's usage of said first and second group is monitored. The amount of resource blocks which is allotted to one of the uplink channels in a cell is then varied depending on the cell's usage of these two groups.

Thus, by means of the present invention, the amount of resource blocks which are allotted to a certain uplink channel such as, for example, the PUCCH in LTE, can be adaptively varied depending on the system's current resource usage, which makes it possible to adaptively allot resource blocks within a data frame.

In a preferred embodiment of the invention, the first group comprises control resources and the second group comprises user resources.

In one embodiment of the invention, the amount of resource blocks allotted to said uplink channel is varied by being increased if the cell's performance is limited by the first group, and in another version of the invention, the amount of resource blocks which is allotted to said uplink channel can be varied by being decreased if the cell's performance is limited by the second group.

The invention also discloses a transceiver for use as a first node which functions according to the inventive method.

BRIEF DESCRIPTION OF THE DRAWINGS

The invention will be described in more detail in the following, with reference to the appended drawings, in which.

DETAILED DESCRIPTION

Figure 1:
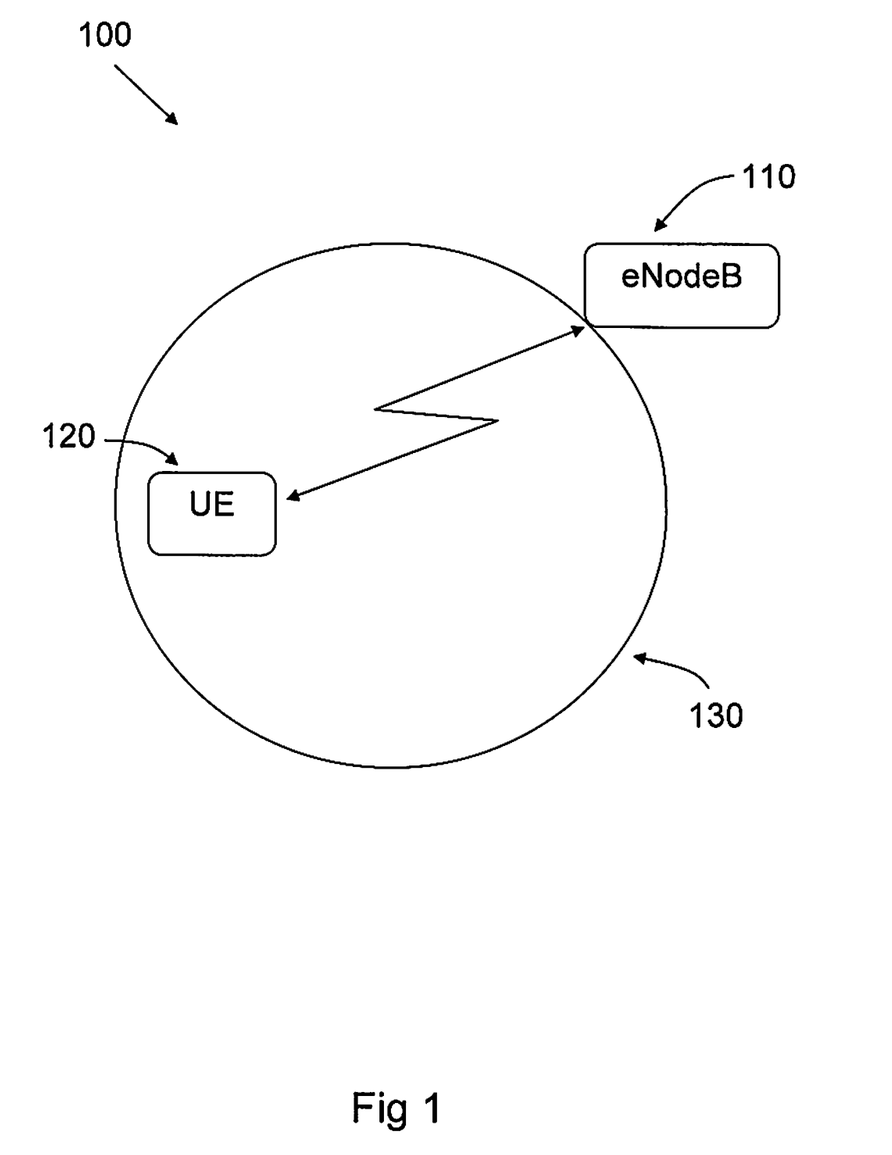
FIG. 1 shows a schematic view of a system in which the invention may be applied.

FIG. 1 shows a schematic view of a cellular communications system 100 in which the present invention may be applied. It should be pointed out that although the invention will be described in the following using terminology borrowed from LTE (Long Term Evolution) systems, this is merely in order to facilitate the reader's understanding of the invention and should not be used in order to restrict the scope of the present invention to such systems.

As shown in FIG. 1, the system 100 can comprise a number of cells, one of which is shown as 130 in FIG. 1, each of which can accommodate a number of users, one of which is shown as 120 in FIG. 1. A user in the system 100 is also sometimes generically referred to as a UE, a "User Equipment", a term which will be used in this description.

The system 100 also comprises a controlling node, which in LTE systems is known as the eNodeB, "evolved NodeB", which has as one of its functions to control traffic to and from the UEs in the cell 130.

Traffic from the UEs to the eNodeB is referred to as uplink traffic, UL traffic, and traffic in the other direction, i.e. from the eNodeB to the UEs is referred to as downlink traffic, DL traffic.

In LTE systems, UL traffic is sent in data frames, so called sub frames, which have a duration in time, at present, of 1 ms, and which cover a number of carrier frequencies, so called sub carriers. In LTE uplink, a number of channels and signals are defined, such as:

The Physical Up Link Control Channel, PUCCH, used for control signals.

The Physical Up Link Shared Channel, PUSCH, used for data and control signals, shared between the UEs in a cell.

The Physical Random Access Channel, PRACH. Used by UEs which are not synchronized, and which need to access the eNodeB.

Figure 2:
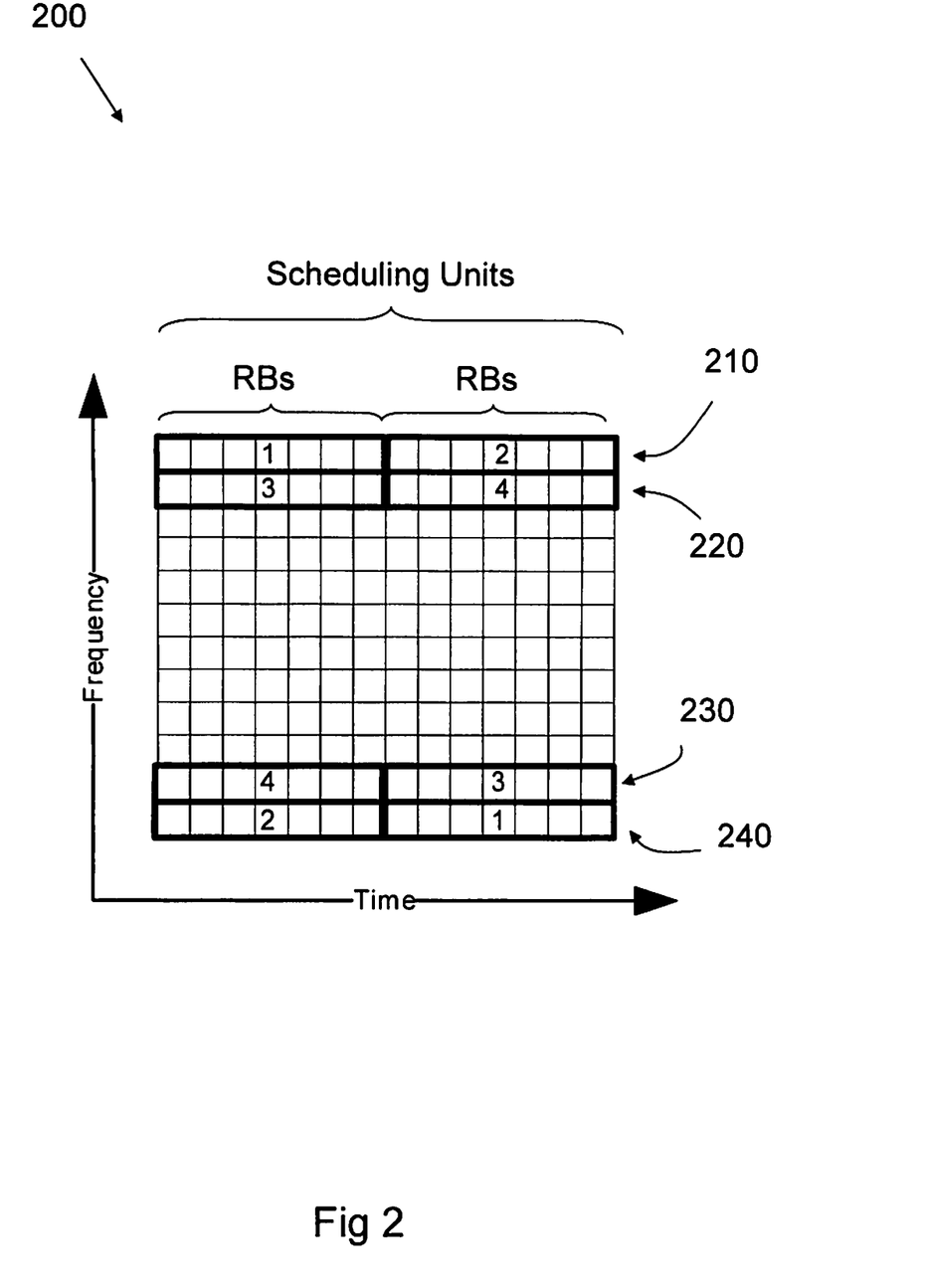
FIG. 2 shows an example of Resource Blocks in the system of FIG. 1.

Each sub frame in LTE comprises so called Resource Blocks, RBs, which can be said to be "smaller frames within the frames". An RB of an LTE sub frame covers, at present, 0.5 ms duration of the sub frame and a number of the sub carriers which are comprised in the data frame. At present 12 subcarriers are covered by an LTE RB. Two LTE RBs comprise a so called scheduling unit FIG. 2 illustrates the concept of RBs and scheduling units, in that it shows a sub frame 200 in which there is comprised four scheduling units, 210-240, which are used for PUCCH. Thus, each of the scheduling units 210-240 covers an entire horizontal row in the sub frame 200, and each of the scheduling units comprises two RBs.

A UE will always use a pair of RBs for PUCCH, although the PUCCH information will usually be spread out over at least two RBs, so that, for example, one UE ("1") will get the RB in the first (in time) half of the scheduling unit 210, and the same UE ("1") will get the RB in the last (in time) half of the scheduling unit 240. From this explanation, it will also be understood that the number of scheduling units used by PUCCH in LTE will always be a multiple of two and the amount of RBs that PUCCH uses will be a multiple of four. The amount of RBs that one and the same UE uses for PUCCH is also a multiple of two.

As can be seen from FIG. 2, the scheduling units s for PUCCH are usually placed at the "band edges", i.e. at the highest/lowest subcarrier frequencies.

Examples of information or signals which a UE may transmit on the PUCCH are the following:

CFR, Channel Feedback Report, i.e. a report from the UE to the eNodeB on the DL channel quality. The CFR is sent with a certain regularity, which depends on, for example, the amount of UEs in the cell, and the load of those UEs.

HARQ ACK/NACK, Hybrid Automated Repeat Request, Acknowledge, Negative Acknowledge, i.e. indications that DL traffic has or hasn't reached its destination, with, in the latter case, a request for retransmission.

Scheduling requests, i.e. a request from the UE to the eNodeB for UL resources.

As will be understood, the amount of resources needed by an UE for PUCCH will vary, depending on a number of factors, such as the amount of CFR, HARQ-ACK and scheduling requests to be transmitted in the uplink. These factors will vary with:

the number of active UEs in the cell, since this will control the amount of CFR reports to be sent, the downlink traffic volume, the multiplexing characteristics, i.e. the amount of UEs addressed in the DL, which will influence the amount of HARQ-ACKs, the UL traffic volume and characteristics, since that will influence the amount of scheduling requests. In conclusion, a UE's need for PUCCH resources will vary over time.

It is an object of the present invention to provide a solution by means of which the amount of RBs used for PUCCH in the UL sub frames in a cell in the system can be adapted to the cell's current needs in a better way than previously. The invention will be described in more detail below, but briefly, a basic principle behind the invention is to adjust the number of RBs used for PUCCH in the UL sub frames of the cell dynamically according to the present needs of the cell.

According to the invention, the number of RBs for PUCCH in the cell's UL sub frames is calculated depending on recent UL history, and the calculation can also include the maximum number of UEs which it is possible to schedule per sub frame. The invention may also, in one of its aspects, include consideration of the need for PUSCH resources in a sub frame, since over-dimensioning of PUCCH is not a problem if those resources are not needed for PUSCH.

In more detail, the invention can be explained as follows: the traffic in a cell is divided into a first and a second group, and the cell's usage of these first and second groups is monitored at certain intervals or continuously.

The amount of resource blocks which is allotted to one of the uplink channels in a cell is then varied depending on the cell's usage of these two groups.

The channel whose allotment of RBs is varied is preferably the PUCCH, but it is entirely within the scope of the invention to apply the invention to another channel in the system, such as, for example, the PUSCH.

The division into the groups should suitably be such that if the cell's performance is limited by the resources in the first group, the number of RBs for PUCCH should be increased, and conversely, if the cell's performance is limited by the resources in the second group, the number of RBs for PUCCH should be decreased.

In a preferred embodiment of the invention, the UL traffic is divided into the groups "user resources" and control resources", according to the following:

Control Resources

CFR, Channel Feedback Report. CFR can be monitored by means of monitoring the CFR report interval, i.e. the ratio or a difference between the actual CFR report interval in the cell and a targeted CFR report interval in the cell. If the ratio or difference exceeds a certain level or threshold, this is an indication that the PUCCH resources should be increased.

Scheduling requests. These can be monitored by means of monitoring the actual scheduling request interval as compared to a targeted scheduling request interval, for example as expressed as a ratio or a difference between the actual and the targeted interval. If the ratio or difference exceeds a certain level or threshold, this is an indication that the PUCCH resources should be increased.

Downlink multiplexing satisfaction, which may be monitored as the ratio or difference between the actual number of multiplexed UEs in the downlink and the ideal or maximum number of multiplexed UEs in downlink if there had not been any PUCCH resource limitations. When the ratio or difference becomes lower than a threshold, this is an indication that the PUCCH resources should be increased.

User Resources

PUSCH, Physical Uplink Shared Channel. The PUSCH utilization can be monitored by measuring the difference or ratio between the available PUSCH resources and the actual PUSCH resource utilization. As long as the difference is higher than a low threshold, this is an indication that the PUCCH resources do not need to be decreased. As long as the difference is above a high threshold, this is an indication that the PUSCH resources should not be decreased even if more PUCCH resources would be needed.

An example of a first detailed embodiment of the inventive method is then as follows:

Increase the number of RBs for PUCCH if this is indicated by one of the following:
  The CFR report interval satisfaction indicates a "deficit",
  OR
  The downlink multiplexing satisfaction indicates a "deficit",
  OR
  The scheduling request interval satisfaction indicates a "deficit".

Decrease the number of RBs for PUCCH if:
  The PUSCH resource utilization indicates a "deficit", i.e. that more resources are needed for PUSCH, which is obtained by decreasing the number of RBs for PUCCH, so that they instead can be used for PUSCH.

The term "deficit" as used above and in the following means that the parameter in question is below or above a certain predefined threshold for that parameter. Thus, a set of thresholds, suitably one for each of the parameters in the two groups above, is used by the invention.

In a version of the invention, the need for PUCCH and PUSCH resources can be considered simultaneously in a more detailed fashion, since "over-dimensioning" of PUCCH is not a problem if the resources used for PUCCH are not needed for PUSCH.

Thus, in the version of the invention which takes the PUSCH resources into consideration, the "increase" condition in the first detailed embodiment above could be expanded with the operator AND, in the following manner:

Increase the number of RBs for PUCCH if this is indicated by one of the following:
  The CFR report interval satisfaction indicates a "deficit",
  OR
  The downlink multiplexing satisfaction indicates a "deficit",
  OR
  The scheduling request interval satisfaction indicates a "deficit",
  AND
  The PUSCH resource utilization does not indicate a deficit.

Similarly, the "decrease" condition in the first detailed embodiment above could be expanded to take both PUCCH and PUSCH into consideration, by adding an AND condition in the following manner:

Decrease the number of RBs for PUCCH if:
  The PUSCH resource utilization indicates a "deficit",
  AND
  The PUCCH resource utilization does not indicate a "deficit".

The resources in the first and second groups are suitably filtered as they are monitored, in order to avoid overly rapid variations in the amount of RBs used for PUCCH. In a preferred embodiment of the invention, the filtering is done by means of calculating the resources as a moving average, which can be filtered with a suitable time constant.

The amount of RBs which are to be used for PUCCH in the UL sub frames in a cell is signalled to the UEs in the cell by the eNodeB of the cell in a broadcast channel, which is transmitted with a certain regularity. The regularity or frequency with which the broadcast channel is transmitted by the eNodeB then becomes the highest frequency with which the RBs used for PUCCH can be altered in the cell.

Figure 3:
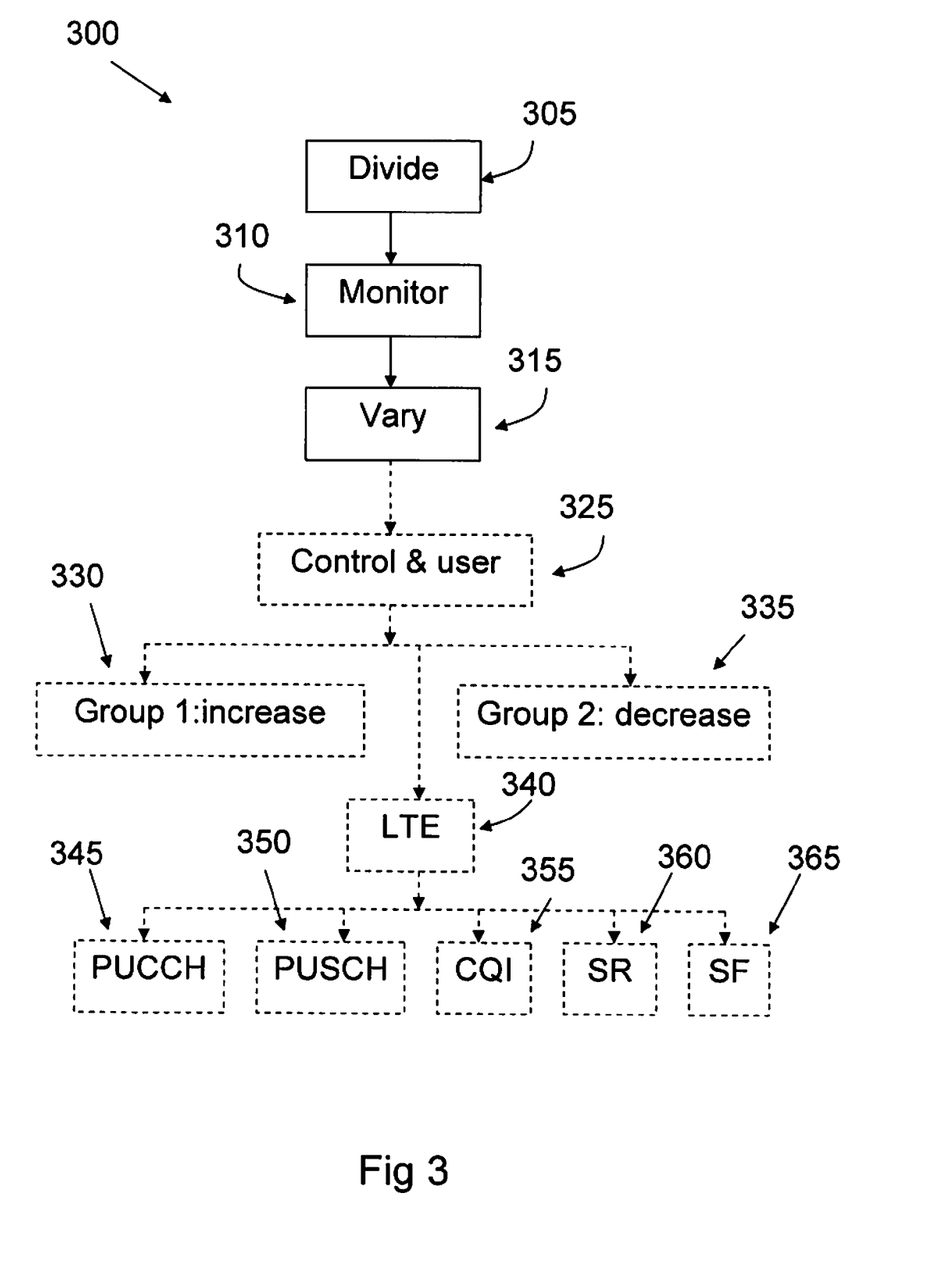
FIG. 3 shows a rough flow chart of a method of the invention.

FIG. 3 shows a rough flow chart of a method 300 of the invention. Steps which are options or alternatives are shown with dashed lines. Thus, and as has emerged from the description above, the method of the invention is intended for use in a cellular wireless communication system such as the one 100 in FIG. 1, in which there is a first node 110 which serves to control traffic to and from users 120 in a certain area 130, a cell, in the system.

In the system 100, traffic between the users 120 and the first node 110 comprises user resources and control resources, and the uplink traffic, i.e. traffic from the users to the first node, comprises channels which are sent in data frames such as the one 200 in FIG. 2. Each data frame comprises a number of resource blocks in scheduling units such as the ones 210, 220, 230, 240, and each uplink channel is allotted a certain amount of resource blocks in each data frame.

According to the inventive method, as shown in step 305, at least part of the traffic between the users and the first node is divided into a first and a second group, and as shown in step 310, a cell's usage of the first and second group is monitored 310. As shown in step 315, the amount of resource blocks which is allotted to one of the uplink channels in a cell 130 is varied depending on the cell's usage of these two groups.

As shown in step 325, in one aspect of the invention, the first group can comprised control resources and the second group can comprise user resources.

Step 330 indicates that in one embodiment of the invention, the amount of resource blocks which is allotted to the uplink channel in question can be varied by being increased if the cell's performance is limited by the first group.

As shown in step 335, in another embodiment of the invention, the amount of resource blocks which is allotted to the uplink channel in question is varied by being decreased if the cell's performance is limited by the second group.

Step 340 shows that the inventive method 300 may be applied to an LTE system, in which case the uplink channels will comprise, step 345, PUCCH, and, step 350, PUSCH. As shown in step 355, in an LTE case, the UL traffic will comprise CFR reports and, step 360, scheduling requests, "SR", as well as, step 365, the data frames being the sub frames, "SF" of the LTE system.

Although not explicitly shown in FIG. 3, in LTE applications, the channel whose amount of resource blocks is varied is the PUCCH, and the control resources in the first group include the CFR, Channel Feedback Report, the Scheduling Requests and the downlink multiplexing degree, with the user resources in the second group including the PUSCH.

Figure 4:
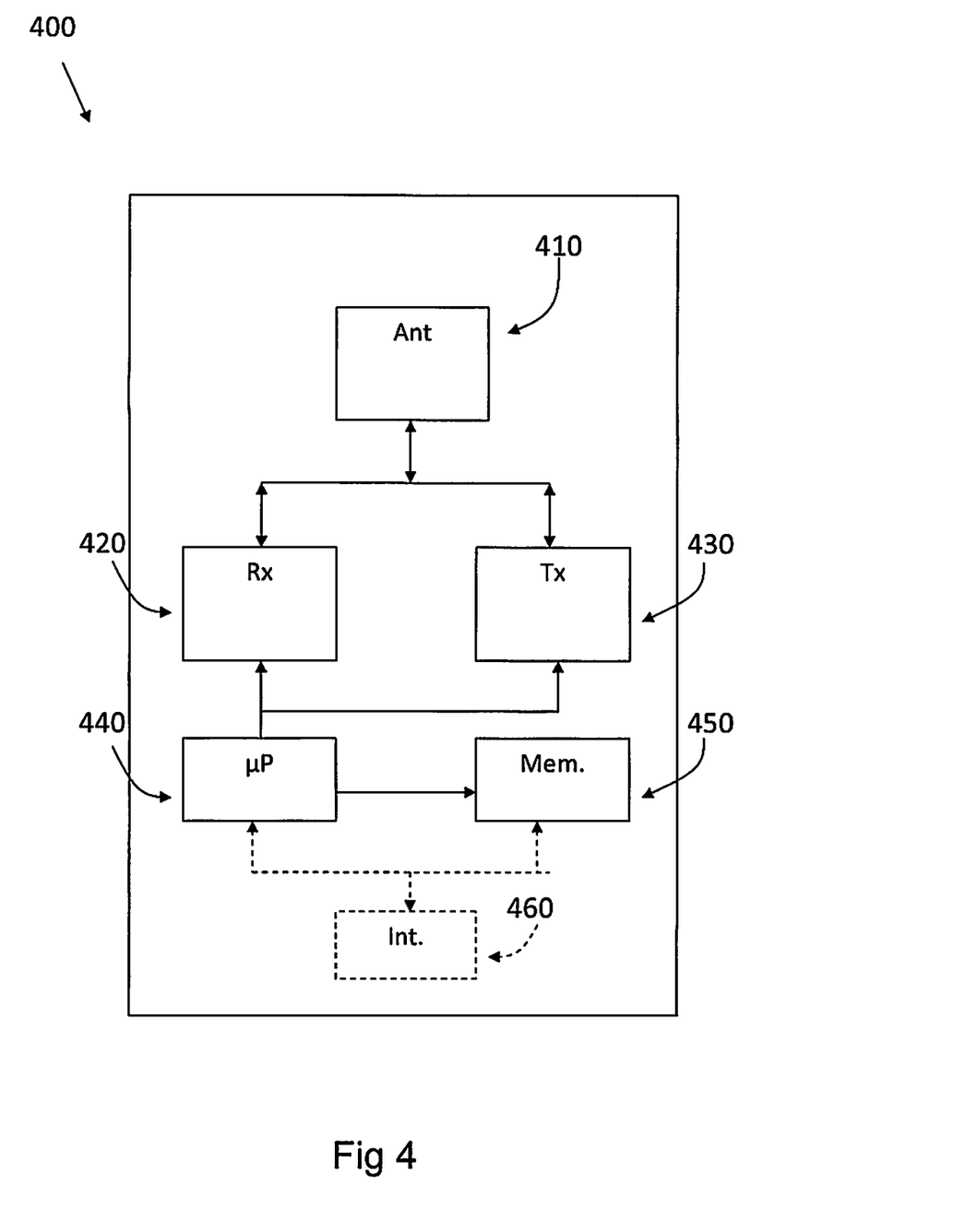
FIG. 4 shows a block diagram of a transceiver of the invention.

FIG. 4 shows a schematic block diagram of a transceiver 400 for use as a first node in a system in which the invention is applied. As indicated in FIG. 4, the first node 400 will comprise an antenna, shown as block 410, and will also comprise a receive part 420 and a transmit part 430. In addition, the first node 400 also comprises a control means 440 such as a micro processor, as well as a memory 450. Furthermore, the first node 400 also comprises an interface 460 towards other components in the system apart from the UEs.

The antenna 410, the transmitter 430, the control means 440 and the memory 450 will serve as means in the transceiver for allotting each uplink channel a certain amount of resource blocks in each data frame, and the control mean s440 together with the memory 450 will serve as means for dividing at least part of the traffic between the users and the first node into a first and a second group.

The transceiver 400 of the invention can use the antenna 410, the receiver 420, the control means 440 together with the memory 450, as means for monitoring a cell's usage of the first and second group. The control unit 440, the transmitter 430 and the antenna 410 will serve as means for varying the amount of resource blocks which is allotted to one of the uplink channels in a cell such as the one 130 in FIG. 1, depending on the cell's usage of these two groups.

The transceiver 400 of the invention will, in one embodiment, divide the traffic in the cell so that the first group comprises control resources and the second group comprises user resources.

In another embodiment, the transceiver 400 can use the varying means 440, 430 and 410 to vary the amount of resource blocks allotted to said uplink channel by increasing it if the cell's performance is limited by the first group.

In a further embodiment, the transceiver 400 uses the varying means 440, 430 and 410 to vary the amount of resource blocks allotted to said uplink channel by decreasing it if the cell's performance is limited by the second group.

In a preferred embodiment, the transceiver 400 is an eNodeB for an LTE system (Long Term Evolution). In such an embodiment, the uplink channels will comprise the PUCCH (Physical Uplink Control Channel) and PUSCH (Physical Uplink Shared Channel) channels, and the traffic will comprise CFR (Channel Feedback Report) reports and scheduling requests, with the data frames in question being the sub frames of the LTE system.

In a preferred LTE application, the channel whose amount of resource blocks is varied is the PUCCH, and the control resources in the first group may include the CFR, Channel Feedback Report, the Scheduling Requests and the downlink multiplexing degree. In addition, the user resources in the second group include the Physical Shared Uplink Channel, PUSCH.

The invention is not limited to the examples of embodiments described above and shown in the drawings, but may be freely varied within the scope of the appended claims.

The invention claimed is:

1. A method for a cellular wireless communication system having a first node configured to control traffic to and from users in a cell of the system, wherein the traffic comprises user resources and control resources, uplink traffic from users to the first node comprises uplink channels sent in data frames, each data frame comprises a number of resource blocks, and each uplink channel is allotted a respective amount of resource blocks in each data frame, the method comprising:
   dividing at least part of the traffic into a first group comprising the control resources and a second group comprising the user resources,
   monitoring the cell's usages of the first and second groups, wherein the usages depend on at least a number of users in the cell, and
   varying the amount of resource blocks allotted to an uplink channel based on the cell's usages in previous data frames of the first and second groups.

2. The method of claim 1, wherein the amount of resource blocks allotted to the uplink channel is increased if the cell's performance is limited by the first group.

3. The method of claim 2, wherein control resources in the first group include Channel Feedback Reports, Scheduling Requests, and multiplexing degrees of downlink channels from the first node to users.

4. The method of claim 2, wherein user resources in the second group include a Physical Shared Uplink Channel.

5. The method of claim 1, wherein the amount of resource blocks allotted to the uplink channel is decreased if the cell's performance is limited by the second group.

6. The method of claim 1, wherein the data frames are subframes of a Long Term Evolution system; the uplink channels comprise a Physical Uplink Control Channel (PUCCH) and a Physical Uplink Shared Channel; the traffic comprises Channel Feedback Reports, Hybrid Automatic Repeat Request acknowledgements, and scheduling requests; and the first node is an Evolved NodeB.

7. The method of claim 6, wherein the channel whose amount of resource blocks is varied is the PUCCH.

8. A transceiver for a first node in a cellular wireless communication system, in which the first node controls traffic to and from users in a cell of the system, the traffic includes user resources and control resources, uplink traffic from users to the first node includes uplink channels sent in data frames, each data frame includes a number of resource blocks, the first node includes a device configured to allot each uplink channel a respective amount of resource blocks in each data frame and a device configured to divide at least part of the traffic between the users and the first node into a first and a second group, the transceiver comprising:
   a device configured to monitor the cell's usages in previous data frames of the first group comprising control resources and the second group comprising user resources, and
   a device configured to vary the amount of resource blocks allotted to an uplink channel based on the cell's usages of the first and second groups, wherein the usages depend on at least a number of users in the cell.

9. The transceiver of claim 8, wherein the device configured to vary the amount of resource blocks is configured to increase the amount of resource blocks allotted to the uplink channel if the cell's performance is limited by the first group.

10. The transceiver of claim 8, wherein the device configured to vary the amount of resource blocks is configured to decrease the amount of resource blocks if the cell's performance is limited by the second group.

11. The transceiver of claim 8, wherein the data frames are subframes of a Long Term Evolution system; the uplink channels comprise a Physical Uplink Control Channel (PUCCH) and a Physical Uplink Shared Channel; the traffic comprises Channel Feedback Reports, Hybrid Automatic Repeat Request acknowledgements, and scheduling requests; and the first node is an Evolved NodeB.

12. The transceiver of claim 11, wherein the channel whose amount of resource blocks is varied is the PUCCH.

13. The transceiver of claim 8, wherein control resources in the first group include Channel Feedback Reports, Scheduling Requests, and multiplexing degrees of downlink channels from the first node to users.

14. The transceiver of claim 8, wherein user resources in the second group include a Physical Shared Uplink Channel.

* * * * *